(12) United States Patent
Mohammadi et al.

(10) Patent No.: US 10,860,927 B2
(45) Date of Patent: Dec. 8, 2020

(54) STACKED CONVOLUTIONAL LONG SHORT-TERM MEMORY FOR MODEL-FREE REINFORCEMENT LEARNING

(71) Applicant: DeepMind Technologies Limited, London (GB)

(72) Inventors: Mehdi Mirza Mohammadi, London (GB); Arthur Clement Guez, London (GB); Karol Gregor, London (GB); Rishabh Kabra, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/586,360

(22) Filed: Sep. 27, 2019

(65) Prior Publication Data
US 2020/0104709 A1  Apr. 2, 2020

Related U.S. Application Data

(60) Provisional application No. 62/737,821, filed on Sep. 27, 2018.

(51) Int. Cl.
*G06N 3/08* (2006.01)
*G06N 3/04* (2006.01)

(52) U.S. Cl.
CPC ............ *G06N 3/08* (2013.01); *G06N 3/0445* (2013.01)

(58) Field of Classification Search
CPC .............................. G06N 3/08; G06N 3/0445
See application file for complete search history.

(56) References Cited

U.S. PATENT DOCUMENTS

| | | | |
|---|---|---|---|
| 2013/0054021 A1* | 2/2013 | Murai | G06N 3/008 |
| | | | 700/245 |
| 2017/0334066 A1 | 11/2017 | Levine et al. | |
| 2019/0325294 A1* | 10/2019 | Cammarota | G06N 3/063 |

(Continued)

OTHER PUBLICATIONS

Rahmatizadeh et al, From Virtual Demonstration to Real-World Manipulation Using LSTM and MDN, 2017, https://arxiv.org/pdf/1603.03833.pdf (Year: 2017).*

(Continued)

*Primary Examiner* — Austin Hicks
(74) *Attorney, Agent, or Firm* — Fish & Richardson P.C.

(57) ABSTRACT

Methods, systems, and apparatus, including computer programs encoded on computer storage media, for controlling an agent interacting with an environment. One of the methods includes obtaining a representation of an observation; processing the representation using a convolutional long short-term memory (LSTM) neural network comprising a plurality of convolutional LSTM neural network layers; processing an action selection input comprising the final LSTM hidden state output for the time step using an action selection neural network that is configured to receive the action selection input and to process the action selection input to generate an action selection output that defines an action to be performed by the agent at the time step; selecting, from the action selection output, the action to be performed by the agent at the time step in accordance with an action selection policy; and causing the agent to perform the selected action.

20 Claims, 4 Drawing Sheets

(56) References Cited

U.S. PATENT DOCUMENTS

2019/0371025 A1* 12/2019 Sukthankar ............. G06T 11/60

OTHER PUBLICATIONS

Shaikh, Automatic Image Captioning using Deep Learning (CNN and LSTM) in PyTorch, Sep. 22, 2018, https://www.analyticsvidhya.com/blog/2018/04/solving-an-image-captioning-task-using-deep-learning/ (Year: 2018).*
Arpit et al., "A Closer Look at Memorization in Deep Networks", arXiv:1706.05394v2, Jul. 1, 2017, 10 pages.
Asadi et al., "Lipschitz Continuity in Model-based Reinforcement Learning", arXiv:1804.07193v3, Jul. 27, 2018, 16 pages.
Bellemare et al., "The Arcade Learning Environment: An Evaluation Platform for General Agents", Journal of Artificial Intelligence Research, 2013, 47:253-279.
Botea et al., "Using Abstraction for Planning in Sokoban", International Conference on Computers and Games, 2002, pp. 360-375.
Buesing et al., "Learning and tering Fast Generative Models for Reinforcement Learning", arXiv:1802.03006v1, Feb. 8, 2018, 15 pages.
Cobbe et al., "Quantifying Generalization in Reinforcement Learning", arXiv:1812.02341v3, Jul. 14, 2019, 14 pages.
Ebert et al., "Visual Foresight: Model-based Deep Reinforcement Learning for Vision Based Robotic Control", arXiv:1812.00568v1, Dec. 3, 2018, 14 pages.
Espeholt et al., "IMPALA: Scalable Distributed Deep-RL with Importance Weighted Actor-Learner 4 Architectures", arXiv:1802.01561v3, Jun. 28, 2018, 22 pages.
Farquhar et al., "TreeQN and ATreeC: Differentiable Tree-Structured Models for Deep Reinforcement Learning", International Conference on Learning Representations, 2018, 15 pages.
Graves, "Adaptive Computation Time for Recurrent Neural Networks", arXiv: 1603.08983v6, Feb. 21, 2017, 19 pages.
Greff et al., "Highway and Residual Networks Learn Unrolled Iterative Estimation", arXiv:1612.07771v3, Mar. 14, 2017, 14 pages.
Guez et al., "Learning to Search with MCTSnets", arXiv:1802.04697v2, Jul. 17, 2018, 12 pages.
He et al., "Deep Residual Learning for Image Recognition", IEEE Conference on Computer Vision and Pattern Recognition, 2016, pp. 770-778.
Higgins et al., "DARLA: Improving zero-shot transfer in reinforcement learning", Proceedings of the 34th International Conference on Machine Learning, 2017, 70:1480-1490.
Hochreiter et al., "Long Short Term Memory", Neural Computation, 1997, 9(8):1735-1780.
Horgan et al., "Distributed Prioritized Experience Replay", arXiv:1803.00933v1, Mar. 2, 2018, 19 pages.
Hu et al., "Squeeze-and-Excitation Networks", IEEE Conference on Computer Vision and Pattern Recognition, 2018, pp. 7132-7141.
Jaderberg et al., "Reinforcement Learning with Unsupervised Auxiliary Tasks", arXiv:1611.05397v1, Nov. 16, 2016, 14 pages.
Jastrzebski et al., "Residual Connections Encourage Iterative Inference", arXiv:1710.04773v2, Mar. 8, 2018, 14 pages.
Kingma et. al., "Adam: A Method for Stochastic Optimization", arXiv:1412.6980v9, Jan. 30, 2017, 15 pages.
Lee et al., "Gated Path Planning Networks", arXiv:1806.06408v1, Jun. 17, 2018, 12 pages.
Mnih et al., "Human-level control through deep reinforcement learning", Nature, Feb. 2015, 518(7540):529-541.
Mnih et al., "Asynchronous Methods for Deep Reinforcement Learning", International Conference on Machine Learning, 2016, pp. 1928-1937.
Oh et al., "Value Prediction Network", Advances in Neural Information Processing Systems, 2017, pp. 6118-6128.
Orseau et al., "Single-Agent Policy Tree Search with Guarantees", Advances in Neural Information Processing Systems, 2018, 11 pages.
Pang et al., "Neural Network Design for J Function Approximation in Dynamic Programming", arXiv:adap-org/9806001v1, Jun. 3, 1998, 52 pages.
Pathak et al., "Curiosity-Driven Exploration by Self-Supervised Prediction", IEEE Conference on Computer Vision and Pattern Recognition Workshops, 2017, pp. 16-17.
Racaniere et al., "Imagination-Augmented Agents for Deep Reinforcement Learning", Advances in Neural Information Processing Systems 30, 2017, 12 pages.
Schmidhuber, "Making the World Differentiable: On using self-supervised fully recurrent neural networks for dynamic reinforcement learning and planning in non-stationary enviroments", Institut Fur Informatik, Technische Universtitat, Munchen, Technical Report FKI-126 90, 1990, 28 pages.
Silver et al., "The predictron: end-to-end learning and planning", Proceedings of the 34th International Conference on Machine Learning, 2017, 70:3191-3199.
Sutton et al., "Reinforcement Learning: An Introduction", Robotica, 1999, 17:229-235.
Talvitie, "Model regularization for stable sample rollouts", Proceedings of the 30th Conference on Uncertainty in Artificial Intelligence, 2014, pp. 780-789.
Tamar et al., "Value Iteration Networks", Advances in Neural Information Processing Systems, 2016, pp. 2154-2162.
Wang et al., "Prefrontal cortex as a meta-reinforcement learning system", Nature Neuroscience, May 2018, 21(6):860, 37 pages.
Williams, "Simple Statistical Gradient Following Algorithms for Connectionist Reinforcement Learning", Machine Learning, May 1992, 8(3-4):229-256.
Shi et al., "Convolutional LSTM Network: A Machine Learning Approach for Precipitation Nowcasting", Advances in Neural Information Processing Systems 28, 2015, pp. 802-810.
Zambaldi et al., "Relational Deep Reinforcement Learning", arXiv:1806.01830v2, Jun. 28, 2018, 15 pages.
Zhang et al., "A Dissection of Overfitting and Generalization in Continuous Reinforcement Learning", arXiv:1806.07937v2, Jun. 25, 2018, 20 pages.
Zhang et al., "Understanding Deep Learning Requires Rethinking Generalization", arXiv:1611.03530v2, Feb. 26, 2017, 15 pages.
Zhang et al., "A study on overfitting in deep reinforcement learning", arXiv:1804.06893v2, Apr. 20, 2018, 25 pages.
PCT International Search Report and Written Opinion in International Appln No. PCT/EP2019/076213, dated Jan. 7, 2020, 18 pages.
Tian et al., "ELF: An Extensive, Lightweight and Flexible Research Platform for Real-time Strategy Games," https://arxiv.org/abs/1707.01067v1, Jul. 2017, 14 pages.

* cited by examiner

STACKED CONVOLUTIONAL LONG SHORT-TERM MEMORY FOR MODEL-FREE REINFORCEMENT LEARNING

CROSS-REFERENCE TO RELATED APPLICATION

This application claims priority to U.S. Provisional Application No. 62/737,821, filed on Sep. 27, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that controls an agent interacting with an environment.

In particular, the reinforcement learning system includes a control neural network system that, in turn, includes at least a convolutional long short-term memory (convLSTM) neural network and an action selection neural network. The convLSTM neural network includes a plurality of convLSTM neural network layers arranged in a stack one after the other.

In one innovative aspect there is described a system for controlling an agent interacting with an environment, the system comprising one or more computers and one or more storage devices storing instructions that when executed by the one or more computers cause the one or more computers to implement a control neural network system.

The control neural network system may comprise a convolutional long short-term memory (LSTM) neural network comprising a plurality of convolutional LSTM neural network layers arranged in a stack one after the other. The convolutional LSTM neural network may be configured to, at each of a plurality of time steps, receive a representation of an observation characterizing a state of the environment at the time step and to process (i) the representation and (ii) a state of the convolutional LSTM neural network as of the time step to (iii) generate a final LSTM hidden state output for the time step and (iv) update the state of the convolutional LSTM neural network for the time step. The control neural network system may further comprise an action selection neural network that is configured to, at each of the plurality of time steps, receive an action selection input comprising the final LSTM hidden state output for the time step and to process the action selection input to generate an action selection output that defines an action to be performed by the agent at the time step in accordance with an action selection policy.

In implementations the state as of the time step includes a respective cell state and a respective hidden state for each convolutional LSTM layer in the stack. The final LSTM hidden state output for the time step may comprise the hidden state of the last convolutional LSTM layer in the stack in the updated state for the time step.

The convLSTM layer structure may help to preserve spatial information within the network, and repeating convLSTM layers may facilitate sequence processing at multiple different levels within the system, thus facilitating tasks which typically require planning e.g. because they have a combinatorial and/or procedural aspect. Thus the combination of convLSTM-based processing, which may allow the storing of spatial information over extended periods of time, together with processing sequences of such information at a hierarchy of levels within the system, may provide a synergistic combination which is particularly good at learning to solve difficult reinforcement learning problems of a type which would be expected to require planning, without needing to include an explicit model of the environment within the system.

In implementations the convolutional LSTM neural network may be configured to process for N ticks for each time step, wherein N is greater than one. The processing may comprise, for each of the N ticks, processing (i) the representation and (ii) a state of the convolutional LSTM neural network as of the tick to update the state of the convolutional LSTM neural network for the tick. The final LSTM hidden state output for the time step may comprise the hidden state of the last convolutional LSTM layer in the stack after the Nth tick for the time step. The updated state of the convolutional LSTM neural network for the time step may comprise the updated state of the convolutional LSTM neural network after the Nth tick for the time step. The state of the convolutional LSTM neural network as of the first of the N ticks for the time step may comprise the updated state of the convolutional LSTM neural network for a preceding time step.

This approach may facilitate the performance of tasks that typically require planning over multiple time steps, but providing additional time step intervals, i.e. ticks, in which the system may be able to plan before taking action.

In implementations each convolutional LSTM neural network layer in the stack may be configured to, at each of the N ticks, process a layer input for the tick to update the cell state and the hidden state of the convolutional LSTM neural network layer as of the tick. The layer input for the tick for each particular convolutional LSTM neural network layer other than the first layer in the stack may comprises the updated hidden state for the tick of the layer immediately before the particular layer in the stack. The layer input for the tick for each layer in the stack may comprise the representation for the time step. For each tick other than the first of the N ticks, the layer input for the tick for the first layer in the stack may comprise the updated hidden state of the last layer in the stack for the preceding tick. For the first of the N ticks, the layer input for the tick for the first layer in the stack may comprise the updated hidden state of the last layer in the stack for the preceding time step. This may further facilitate performing tasks which could benefit from planning over multiple ticks before taking action.

In some implementations the convolutional LSTM neural network is further configured to perform the following operations for each tick and for each convolutional LSTM layer: For each channel dimension of the updated hidden state of the layer for the time step apply one or more pooling operations spatially to generate one or more pooled outputs for the channel dimension, project the pooled outputs using a linear layer corresponding to the convolutional LSTM layer to generate a projected output, and tile the projected output over space to generate a summary tensor. The layer input for each layer in the stack for the tick may comprises the summary tensor for the layer for the preceding tick or, if the tick is the first tick for the time step, the summary tensor for the layer for the Nth tick for the preceding time step. The one or more pooling operations comprise a max pooling operation, a mean pooling operation, or both. This may help information to propagate faster through the system, and hence may improve performance on tasks where a faster response is desirable and/or may facilitate faster learning of tasks.

In some implementations the convolutional LSTM neural network may be configured to append a feature map to the input of the convolutional operators for the convolutional LSTM layers in the stack, that designates a boundary of an input tensor to the convolutional operator. This may facilitate the system learning to perform a task when the observations include images and the boundary defines an edge of the images.

In some implementations the action selection input may further comprise the representation for the time step.

The neural network system may further comprise an encoder neural network configured to, at each of the plurality of time steps, process the observation characterizing the state of the environment at the time step to generate the representation of the observation for the time step. The observation may comprise an image of the environment and the encoder neural network may comprise one or more convolutional layers. The action selection neural network comprises one or more fully-connected layers.

In some implementations the representation comprises an H×W×C tensor. The state of the convolutional LSTM neural network and the final LSTM hidden state output may preserve the spatial dimensions of the representation.

There is also described a method for controlling an agent interacting with an environment. The method may comprise the following, at each of a plurality of time steps, obtaining a representation of an observation characterizing a state of the environment at the time step. The method may further comprise, at each time step, processing the representation using a convolutional long short-term memory (LSTM) neural network comprising a plurality of convolutional LSTM neural network layers arranged in a stack one after the other. The convolutional LSTM neural network may be configured to receive the representation of the observation characterizing the state of the environment at the time step and to process (i) the representation and (ii) a state of the convolutional LSTM neural network as of the time step to (iii) generate a final LSTM hidden state output for the time step and (iv) update the state of the convolutional LSTM neural network for the time step. The method may further comprise, at each time step, processing an action selection input comprising the final LSTM hidden state output for the time step using an action selection neural network that is configured to receive the action selection input and to process the action selection input to generate an action selection output that defines an action to be performed by the agent at the time step in accordance with an action selection policy. The method may further comprise, at each time step, selecting, from the action selection output, the action to be performed by the agent at the time step in accordance with the action selection policy. The method may further comprise causing the agent to perform the selected action at each time step.

Further features of the method may correspond to those previously described for the control neural network system.

Particular embodiments of the subject matter described in this specification can be implemented so as to realize one or more of the following advantages.

The described neural network system has an architecture that is high-capacity and encourages iterative computation. The increased capacity provided by such architectures was previously thought to be detrimental to achieving high performance on reinforcement learning tasks because such neural networks were thought to be difficult to train and to be more prone to over-fitting to the training data and to simply memorizing experiences, resulting in poor generalization after training. Thus, such architectures have been to date deprecated for reinforcement learning tasks involving controlling an agent.

However, because of the manner in which the described neural network system employs recurrence in the 2D space through a stack of convLSTM neural network layers and the iteration of that recurrence within a given time step (by processing for multiple ticks within the time step), the described systems exhibit high performance, particularly for tasks that require planning, that have a limited amount of training data, or both. Additionally, the described systems exhibit "learned pondering" and amortize difficult decisions, i.e., difficult action choices, over multiple steps, each with fixed computational cost. More generally, contrary to prior expectations of those skilled in the art, the "overflexibility" (or high-compute nature) of the described neural network system does not result in poor performance (e.g., overfitting or being harder to optimize) and instead results in state-of-the-art performance on several different agent control tasks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
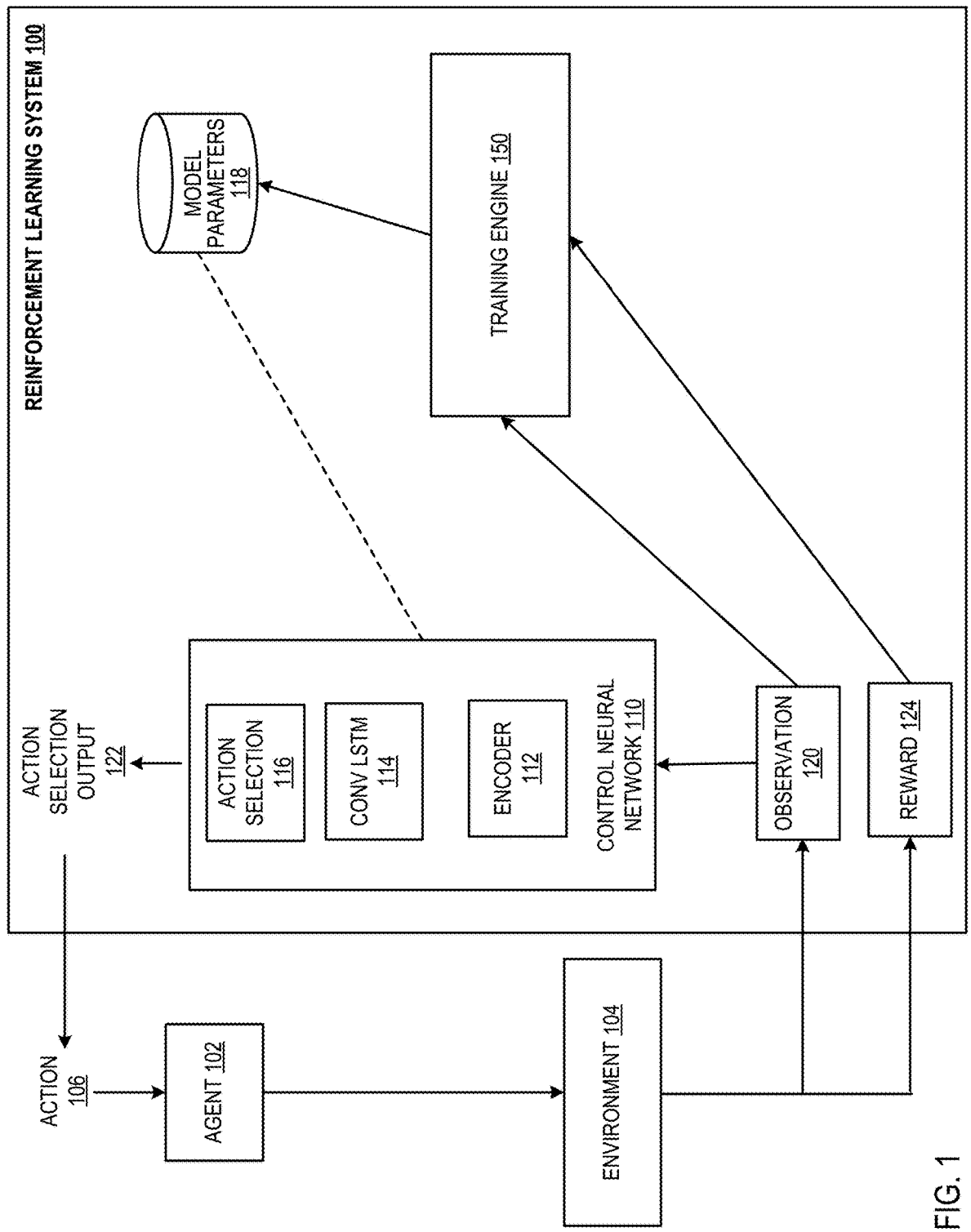
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future planned electrical power generation, and the agent may control actions or operations in the plant to achieve this.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In some implementations, the simulated environment may be a simulation of a particular real-world environment. For example, the system may be used to select actions in the simulated environment during training or evaluation of the control neural network and, after training or evaluation or both are complete, may be deployed for controlling a real-world agent in the real-world environment that is simulated by the simulated environment. This can avoid unnecessary wear and tear on and damage to the real-world environment or real-world agent and can allow the control neural network to be trained and evaluated on situations that occur rarely or are difficult to re-create in the real-world environment.

Generally, in the case of a simulated environment, the observations may include simulated versions of one or more of the previously described observations or types of observations and the actions may include simulated versions of one or more of the previously described actions or types of actions.

FIG. 1 shows an example reinforcement learning system 100. The reinforcement learning system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

The system 100 includes a control neural network system 110, a training engine 150, and one or more memories storing a set of model parameters 118 of the control neural network 110.

At each of multiple time steps, the control neural network 110 is configured to process an input that includes the current observation 120 characterizing the current state of the environment 104 in accordance with the model parameters 118 to generate an action selection output 122.

The system 100 uses the action selection output 122 to control the agent, i.e., to select the action 106 to be performed by the agent at the current time step in accordance with an action selection policy.

A few examples of using the action selection output 122 to select the action 106 to be performed by the agent are described next.

In one example, the action selection output 122 defines a probability distribution over possible actions to be performed by the agent. For example, the action selection output can include a respective action probability for each action in a set of possible actions that can be performed by the agent to interact with the environment. In another example, the action selection output 122 can include parameters of a distribution over the set of possible actions. The system 100 can select the action to be performed by the agent based on the action selection output 122 using any of a variety of action selection policies, e.g., by sampling an action in accordance with the probability values for the actions, or by selecting the action with the highest probability value.

In another example, the action selection output 122 identifies an optimal action from the set of possible actions to be performed by the agent in response to the observation. For example, in the case of controlling a mechanical agent, the action selection output can identify torques to be applied to one or more joints of the mechanical agent. The system 100 can select the action to be performed by the agent based on the action selection output 122 using any of a variety of action selection policies, e.g., by selecting the identified optimal action or by adding noise to the optimal action to encourage exploration and selecting the noise-added action.

In another example, the action selection output 122 may include a respective Q-value for each action in the set of possible actions that can be performed by the agent.

The Q value for an action is an estimate of a "return" that would result from the agent performing the action in response to the current observation 120 and thereafter selecting future actions performed by the agent 102 in accordance with current values of the control neural network parameters.

A return refers to a cumulative measure of "rewards" 124 received by the agent, for example, a time-discounted sum of rewards. The agent can receive a respective reward 124 at each time step, where the reward 124 is specified by a scalar numerical value and characterizes, e.g., a progress of the agent towards completing an assigned task.

The system 100 can select the action to be performed by the agent based on the action selection output 122 using any of a variety of action selection policies, e.g., by selecting the action with the highest Q value or by mapping the Q values to probabilities and sampling an action in accordance with the probabilities.

In some cases, the system 100 can select the action to be performed by the agent in accordance with an exploration policy. For example, the exploration policy may be an $\epsilon$-greedy exploration policy, where the system 100 selects the action to be performed by the agent in accordance with the action selection output 122 with probability 1−$\epsilon$, and randomly selects the action with probability $\epsilon$. In this example, $\epsilon$ is a scalar value between 0 and 1.

In some cases, in addition to any of the above, the action selection output 122 can also include a value function output that is an estimate of the value, i.e., in terms of predicted return, of being in the current state characterized by the observation to successfully accomplishing a task.

The control neural network 110 includes at least a convolutional long short-term memory (convLSTM) neural network 114 and an action selection neural network 116.

The convLSTM neural network 114 includes a plurality of convLSTM neural network layers arranged in a stack one after the other. A convLSTM neural network layer is a LSTM layer that replaces matrix multiplication with convolution operations at each gate in the LSTM cell. Thus, the input to the convLSTM layer, the cell states, and the hidden states of the convLSTM layer can each be represented as a three-dimensional tensor.

An LSTM layer may include LSTM units each having one or more gates and a memory cell. There are many LSTM variants but in broad terms the one or more gates control one or more of information entering, being retained in, and leaving the LSTM unit for a next time step or to another neural network component at the same time step. The LSTM layer may learn weight matrices which control operation of the gates, e.g., an input weight matrix to modify an input to the gate to generate an output. In a convLSTM the weight matrix is replaced by a kernel for a convolution operation. Thus a convLSTM layer may be a neural network layer that includes convLSTM units, each having one or more gates and a memory cell for processing a layer input to generate an output, wherein the one or more gates are each configured to perform a convolution operation on an input to the gate to determine an output from the gate for generating the output.

At each time step during the controlling of the agent 102, the convLSTM neural network 114 is configured to receive a representation of the observation 120 characterizing the state of the environment 104 at the time step and to process (i) the representation and (ii) a state of the convLSTM neural network as of the time step to (iii) generate a final LSTM hidden state output for the time step and (iv) update the state of the convLSTM neural network for the time step.

As is described in more detail below, in some implementations the convLSTM neural network 114 processes for multiple "ticks" for each time step in order to generate a final LSTM hidden state output for the time step and (iv) update the state of the convLSTM neural network for the time step. A tick, as used in this specification, is an iteration of processing that occurs at a given time step. When the convLSTM neural network 114 processes for multiple ticks at each time step, multiple iterations of processing occur before the system 100 selects the action to be performed by the agent in response to the observation at the time step. This can allow the convLSTM neural network 114 to amortize planning decisions over multiple iterations, each with fixed computational cost. In other words, unlike some conventional systems that maintain an internal state and update that internal state a single time at each time step as part of controlling the agent, the convLSTM neural network 114 updates the state multiple times (i.e., once at each of multiple ticks) at any given time step before an action selection output is generated for the time step.

The operations of the convLSTM neural network 114 are described in more detail below with reference to FIGS. 2 and 3.

The action selection neural network 116 is configured to, at each of the time steps, receive an action selection input including the final LSTM hidden state output for the time step and to process the action selection input to generate the action selection output 122 that defines the action 106 to be performed by the agent 102 at the time step. As a particular example, the action selection neural network 116 can be a fully-connected neural network, i.e., with one or more fully-connected neural network layers, that is adapted to generate an output that has the number of dimensions required for the type of action selection output that is being generated.

In some implementations, there is a residual connection from the input to the convLSTM neural network 114 to the input to the action selection neural network 116. In other words, in these implementations, the action selection input also includes the representation of the observation 120 that is processed by the convLSTM neural network 114.

In some implementations, the representation of the observation 120 that is received by the convLSTM neural network 114 is the observation 120.

In other implementations, the control neural network 110 includes an encoder neural network 112 that processes the observation 120 to generate the representation that is provided as input to the convLSTM neural network 114. For example, the encoder neural network 112 can be a convolutional neural network that processes the observation to generate a fixed size H×W×C tensor that is the representation that is provided as input to the convLSTM neural network 114.

The training engine 150 is configured to train the control neural network 110 by repeatedly updating the model parameters 118 of the control neural network 110, i.e., the parameters of the encoder neural network 112, the convLSTM neural network 114, and the action selection neural network 116 based on the interactions of the agent with the environment.

In particular, the training engine 150 trains the control neural network 110 using reinforcement learning using observations 120 and rewards 124 generated as a result of the agent interacting with the environment during training.

Generally, the training engine 150 can train the control neural network 110 to increase the return (i.e., cumulative measure of reward) received by the agent using any appropriate reinforcement learning technique. One example of a technique that can be used by the training engine 150 to train the control neural network 110 is the A3C technique, described in Mnih, V., Badia, A. P., Mirza, M., Graves, A., Lillicrap, T., Harley, T., Silver, D., and Kavukcuoglu, K. Asynchronous methods for deep reinforcement learning. In International conference on machine learning, pp. 1928-1937, 2016. Another example of a technique that can be used by the training engine 150 to train the control neural network 110 is the IMPALA V-trace technique, described in Espeholt, L., Soyer, H., Munos, R., Simonyan, K., Mnih, V., Ward, T., Doron, Y., Firoiu, V., Harley, T., Dunning, I., et al. Impala: Scalable distributed deep-rl with importance weighted actor-learner architectures. arXiv preprint arXiv:1802.01561, 2018. In some cases, the system 100 uses a distributed framework during training in which multiple agents interact with different replicas of the same environment.

Figure 2:
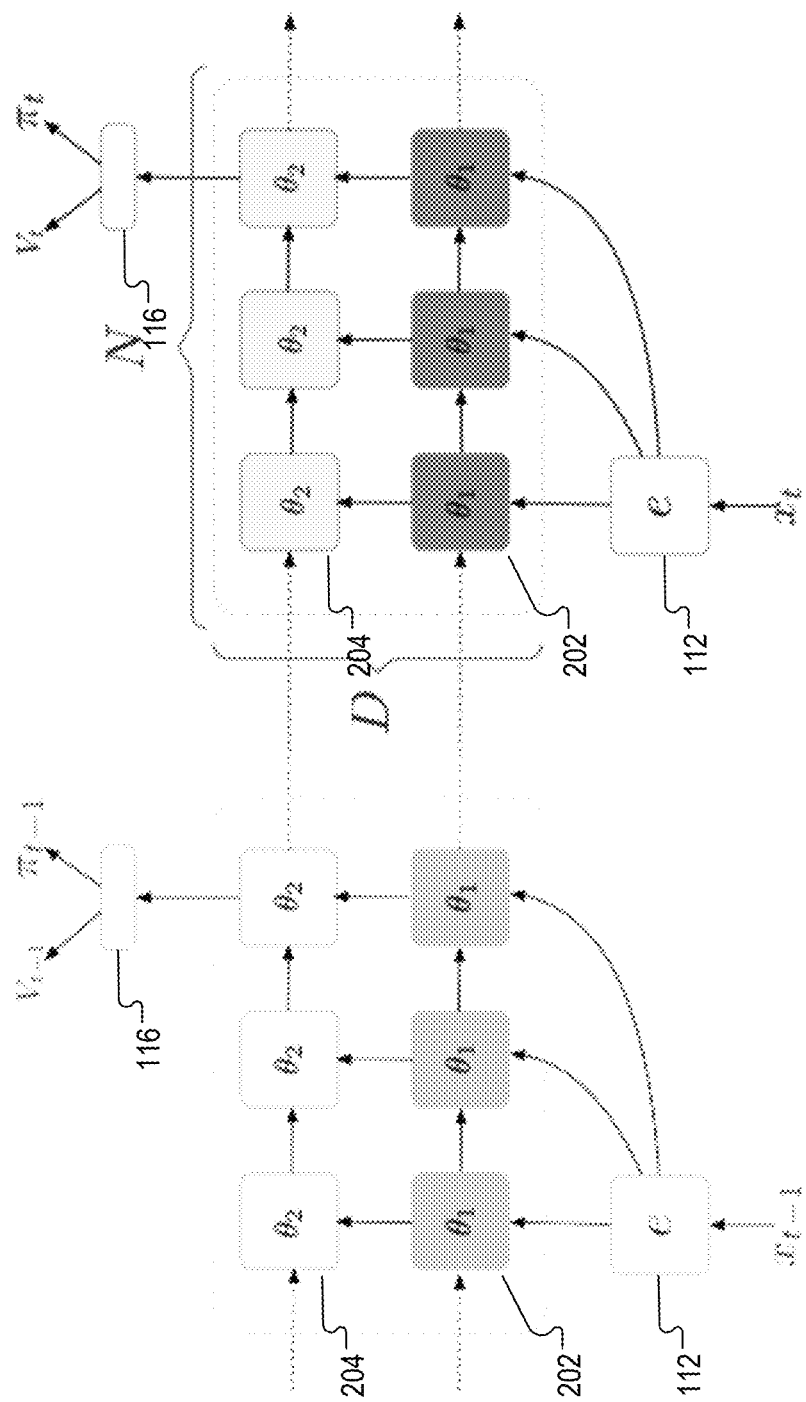
FIG. 2 shows an example of the processing of the control neural network for two time steps.

FIG. 2 shows an example of the processing of the control neural network 110 at two time steps. In particular, FIG. 2 shows how the control neural network 110 generates action selection outputs for a time step t−1 and a time step t.

In the example of FIG. 2, the control neural network 110 includes the encoder neural network 112 (also denoted as e), the convLSTM neural network 114, and the action selection neural network 116.

Further, in the example of FIG. 2, the convLSTM neural network 114 includes two convLSTM layers 202 and 204 (also denoted as $\theta_1$ and $\theta_2$, respectively). That is, the stack of convLSTM layers has a depth D of two.

The convLSTM neural network 114 processes for N=3 ticks at each time step. That is, the convLSTM neural network 114 performs three iterations at each time step before providing a final output to the action selection network 116.

Thus the convLSTM neural network 114 may be characterized by parameters D and N, which may be selected according to a task to be learned. For example each of D and N may be in the range 1-10 e.g. each of D and N may be equal to 3 or D can be equal to 2 and N can be equal 3 or D can be equal to 4 and N can be equal 2.

At time step t−1, the control neural network 110 receives as input an observation $x_{t-1}$ and processes the observation $x_{t-1}$ to generate a representation of the observation $x_{t-1}$.

The control neural network 110 then processes the representation using the convLSTM layers 202 and 204 to generate a final LSTM hidden state output for the time step. As shown in FIG. 2, the final LSTM hidden state output is the updated hidden state of the last layer in the stack, i.e., convLSTM layer 204, after the Nth tick for the time step t−1.

The action selection neural network 116 receives an input that includes the final LSTM hidden state output and processes the input to generate the action selection output for the time step t−1. In the example of FIG. 2, the action selection output includes a value output $V_{t-1}$ and a policy output $\pi_{t-1}$ that defines a probability distribution over the set of actions that can be performed by the agent. The system can then select an action using the policy output in accordance with an action selection policy and then cause the agent to perform the selected action.

At the time step t, the control neural network 110 receives as input an observation $x_t$ and processes the observation $x_t$ to generate a representation of the observation $x_t$.

The control neural network 110 then processes the representation using the convLSTM layers 202 and 204 to generate a final LSTM hidden state output for the time step. As shown in FIG. 2, the final LSTM hidden state output is the updated hidden state of the last layer in the stack, i.e., convLSTM layer 204, after the Nth tick for the time step t.

The action selection neural network 116 receives an input that includes the final LSTM hidden state output and processes the input to generate the action selection output for the time step t, i.e., to generate a value output $V_t$ and a policy output $\pi_t$ that defines a probability distribution over the set of actions that can be performed by the agent. The system can then select an action using the policy output in accordance with an action selection policy and then cause the agent to perform the selected action.

The operation of the convLSTM layers in the convLSTM neural network will now be described with reference to the processing that occurs at time step t. However, it should be understood that similar processing will occur at each time step at which the agent is being controlled using the control neural network 110.

At the time step t, The convLSTM neural network 114 is configured to receive the representation of the observation $x_t$ and to process (i) the representation and (ii) a state of the convLSTM neural network 114 as of the time step t to (iii) generate a final LSTM hidden state output for the time step t and (iv) update the state of the convLSTM neural network 114 for the time step t. For the first time step of controlling an agent, i.e., the first time step in a task episode, the state of the convLSTM neural network 114 as of the time step can be a predetermined or learned initial state. For all of the other time steps of controlling the agent, the state of the convLSTM neural network 114 as of the time step is the updated state of the convLSTM neural network 114 for a preceding time step, i.e., the final state of the convLSTM neural network 114 after the time step t−1.

The state of the convLSTM neural network 114 generally includes a respective cell state and a respective hidden state for each convLSTM layer in the stack. That is, the convLSTM layers 202 and 204 each maintain a respective cell state and a respective hidden state. Because the layers 202 and 204 are convLSTM layers, the cell states and the hidden states are three dimensional tensors as opposed to vectors.

The final LSTM hidden state output for the time step is the hidden state of the last convLSTM layer in the stack in the updated state for the time step, i.e., the updated hidden state of the convLSTM layer 204.

As described above, in some implementations the convLSTM neural network is configured to process for N ticks at each time step, where N is an integer greater than one. In particular, in the example shown in FIG. 2, N is equal to three.

In these implementations, at each of the N ticks, the convLSTM neural network processes (i) the representation of the observation $x_t$ and (ii) a state of the convLSTM neural network as of the tick to update the state of the convLSTM neural network for the tick.

The convLSTM neural network then uses the updated state of the convLSTM neural network after the last tick as the updated state for the time step and, accordingly, the hidden state of the last convLSTM layer in the stack after the last tick as the final LSTM hidden state output for the time step.

Generally, when processing a given input at a tick n for time step t, the d-th convLSTM layer in the stack performs the following operations to generate an updated cell state of the layer for the n-th tick $c_d^n$ and an updated hidden state of the layer for the n-th tick $h_d^n$:

$$c_d^n, h_d^n = \text{ConvLSTM}_{\theta_d}(i_t, c_d^{n-1}, h_d^{n-1}, h_{d-1}^n),$$

where $i_t$ is the representation at time step t, $c_d^{n-1}$ is the cell state of the layer after the preceding tick, $h_d^{n-1}$ is the hidden state of the layer after the preceding tick, and $h_{d-1}^n$ is the hidden state of the layer d−1, i.e., the layer below the layer d in the stack, for the n-th tick. These quantities can jointly be referred to as the layer input to the convLSTM layer at the n-th tick.

For the first of the n ticks at time step t, the system uses the hidden state and cell state from the preceding time step, i.e., time step t−1.

In some implementations, for the first layer in the stack, the system uses a predetermined fixed hidden state in place of the hidden state of the layer below the layer d in the stack, i.e., because there are no layers below the first layer in the stack.

In some other implementations, however, the layer input for the tick for the first layer in the stack includes the updated hidden state of the last layer in the stack for the preceding tick in place of the hidden state of the layer below the layer d in the stack. This can allow for more general computation, i.e., because the information can now flow down through the stack instead of only up and can improve network performance on some tasks without adding any computational overhead.

In some cases, the layer input for the convLSTM layer can also include additional information at each tick, i.e., $i_t$ can denote not only the representation but a combination, e.g., depth concatenation, of the representation and an additional input to the layer.

For example, the layer input for each layer in the stack can include a summary tensor for the layer for the preceding tick or, if the tick is the first tick for the time step, the summary tensor for the layer for the Nth tick for the preceding time step.

Generally, a summary tensor for a layer for a given tick is a pooled version of the hidden state of the layer after the preceding tick. In particular, to generate the summary tensor for a tick, the convLSTM neural network can, for each channel dimension of the updated hidden state of the layer for the time step, apply one or more pooling operations spatially to the channel dimension to generate one or more pooled outputs for the channel dimension, i.e., to aggregate the hidden state along the spatial dimension. That is, the system can generate a respective pooled vector for each channel that is a concatenation of the output of each kind of pooling operation that is being applied, i.e., max pooling, mean pooling, or both max and mean pooling. The system can then project the pooled outputs, i.e., the respective pooled vectors, using a linear layer corresponding to the convLSTM layer to generate a projected output, and then tile the projected output over space to generate a summary tensor that has the same spatial dimensions as the other tensors in the layer input.

Including this summary tensor in the layer input for a given tick can allow information to propagate faster in the spatial dimensions than the size of the convolutional kernel for the convLSTM layers. This can, e.g., allow the training of the control neural network to converge faster and reduce the amount of computational resources consumed by the training process.

More specifically, the d-th convLSTM layer in the stack performs the following at the n-th tick to generate $c_d^n$ and $h_d^n$:

$$f_d^n = \sigma(W_f * i_t + W_{f h1} * h_{d-1}^n + W_{f h2} * h_d^{n-1} + b_f),$$

$$i_d^n = \sigma(W_i * i_t + W_{i h1} * h_{d-1}^n + W_{i h2} * h_d^{n-1} + b_i),$$

$$o_d^n = \sigma(W_o * i_t + W_{o h1} * h_{d-1}^n + W_{o h2} * h_d^{n-1} + b_o),$$

$$c_d^n = f_d^n \odot c_d^{n-1} + i_d^n \odot \tanh(W_c * i_t + W_{c h1} * h_{d-1}^n + W_{c h2} * h_d^{n-1} + b_c)$$

$$h_d^n = o_d^n \odot \tanh(c_d^n)$$

where * denotes convolution, $\odot$ denotes point-wise multiplication, $f_d^n$ is the forget gate for the convLSTM layer, $i_d^n$ is the input gate for the convLSTM layer, $o_d^n$ is the output gate for the convLSTM layer, each W is a respective convolutional kernel of the convLSTM layer, and each b is a respective bias vector.

In some cases, the convLSTM neural network can be configured to append a feature map to the input of the convolutional operators for the convLSTM layers in the stack that designates a boundary of an input tensor to the convolutional operator. That is, because the convolutional operator is translation invariant, the network can append a feature map to the input of the convolutional operators that has ones on the boundary and zeros inside to provide information to the convolutional operator that explicitly identifies theboundary.

In some implementations, the state of the convLSTM neural network and the final LSTM hidden state output preserve the spatial dimensions of the representation of the observation. That is, if the representation is an H×W×C tensor, the state of the convLSTM neural network and the final LSTM hidden state output will also have the same spatial dimensionality (H×W) as the representation.

Figure 3:
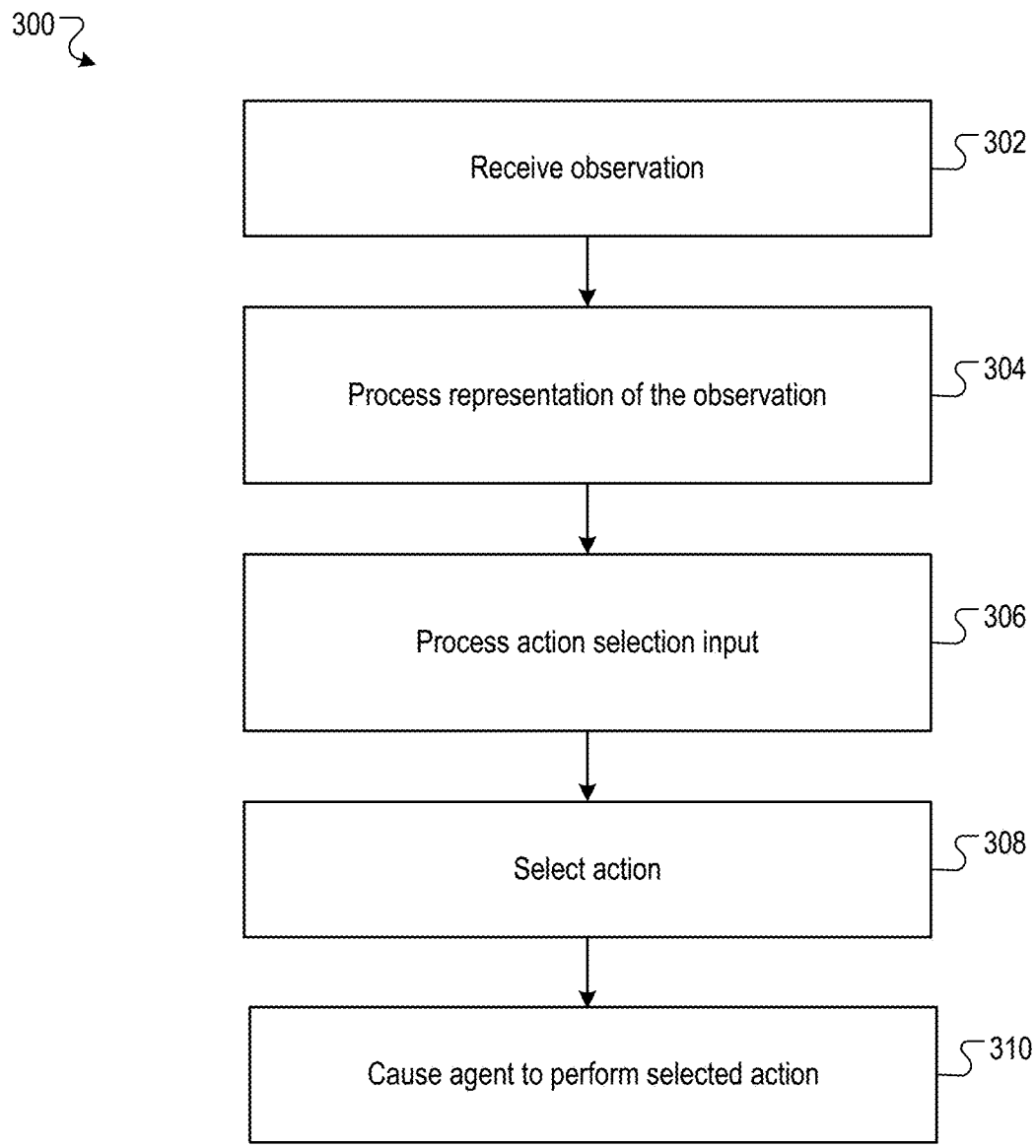
FIG. 3 is a flow diagram of an example process for selecting an action.

FIG. 3 is a flow diagram of an example process 300 for selecting an action at a time step. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system can repeatedly perform the process 300 across multiple time steps to control the agent, i.e., to cause the agent to interact with the environment to perform a task.

The system receives an observation (step 302).

The system processes a representation of the observation using the convLSTM neural network (step 304).

As described above, in some implementations the representation of the observation is the observation while in other implementations the system processes the observation using an encoder neural network to generate the representation that is provided as input to the convLSTM neural network.

The convLSTM neural network is configured to receive the representation and to process (i) the representation and (ii) a state of the convLSTM neural network as of the time step to (iii) generate a final LSTM hidden state output for the time step and (iv) update the state of the convLSTM neural network for the time step. For the first time step of controlling an agent, i.e., the first time step in a task episode, the state of the convLSTM as of the time step can be a predetermined or learned initial state. For all of the other time steps of controlling the agent, the state of the convLSTM as of the time step is the updated state of the convLSTM neural network for a preceding time step.

The state of the convLSTM neural network generally includes a respective cell state and a respective hidden state for each convLSTM layer in the stack and the final LSTM hidden state output for the time step is the hidden state of the last convLSTM layer in the stack in the updated state for the time step. That is, the convLSTM updates the state of the convLSTM neural network by updating the cell state and hidden state of each convLSTM layer and uses the updated hidden state of the last convLSTM layer in the stack as the final LSTM hidden state output.

As described above, in some implementations the convLSTM neural network is configured to process for N ticks at each time step, where N is an integer greater than one. In these implementations, at each of the N ticks the convLSTM neural network processes (i) the representation and (ii) a state of the convLSTM neural network as of the tick to update the state of the convLSTM neural network for the tick. The convLSTM neural network then uses the updated state of the convLSTM neural network after the last tick as the updated state for the time step and, accordingly, the hidden state of the last convLSTM layer in the stack after the last tick as the final LSTM hidden state output for the time step.

The system processes an action selection input that includes the final LSTM hidden state output for the time step using the action selection neural network to generate an action selection output (step 306). As described above, the action selection neural network can be configured to generate any of a variety of action selection outputs that can be used to control the agent in accordance with an action selection policy.

The system selects, from the action selection output, the action to be performed by the agent at the time step in accordance with an action selection policy (step 308).

The system causes the agent to perform the selected action (step 310), e.g., by transmitting, to a control system of the agent, instructions that cause the control system to control the agent or by directly controlling the agent, e.g., directly applying torques to the joints of the agent.

Figure 4:
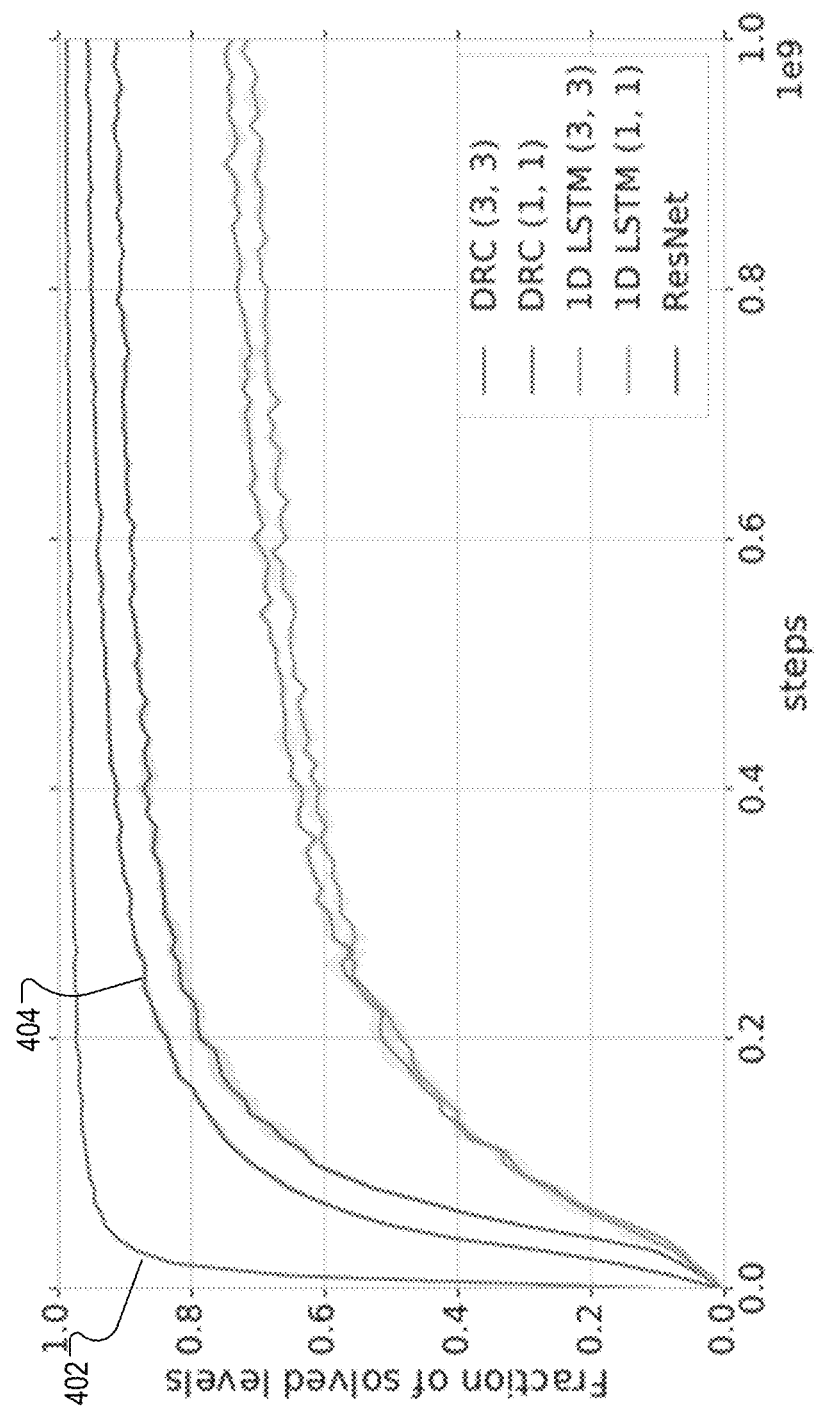
FIG. 4 shows the performance of the described systems relative to the performance of other, conventional systems on a task that requires planning.

FIG. 4 shows the performance of the described systems relative to the performance of other, conventional systems on a task that requires planning. In particular, FIG. 4 plots, for each of multiple systems, the fraction of solved levels (on the y-axis) as a function of the number training steps (on the x-axis). In particular, the task shown in FIG. 4 is a task that requires the agent to move objects, e.g., boxes, to specified locations and also include the property that moving an object to an incorrect location will cause the task to be impossible to complete. The "levels" referred to in the Figure are different environment configurations, i.e., different numbers of boxes, obstacles, target locations, and different incorrect locations, and solving the level refers to successfully completing the task when the environment is in the corresponding configuration. Thus, because moving an object to an incorrect location will cause the agent to fail the task, action planning is required to progress toward the correct location while avoiding actions that result in objects being moved to incorrect locations. Curve 402 shows the performance of a (3, 3) version of the described system, i.e., 3 convLSTM layers that process for 3 ticks, and curve 404 shows a scaled-down, (1, 1) version of the system. The remainder of the curves show conventional systems, e.g., systems that use non-convolutional LSTMs or ResNets (i.e., convolutional neural networks with residual blocks) to generate the outputs that are consumed by the action selection neural network. As can be seen from FIG. 4, the described system achieves high performance in a very small number of training steps relative to the conventional systems. This can be attributed to the various aspects of the convLSTM neural network that are described in this specification, which make it possible for the system to plan without requiring an explicit model of the environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for controlling an agent interacting with an environment, the system comprising one or more computers and one or more storage devices storing instructions that when executed by the one or more computers cause the one or more computers to implement a control neural network system, the control neural network system comprising:
    a convolutional long short-term memory (LSTM) neural network comprising a plurality of convolutional LSTM neural network layers arranged in a stack one after the other,
        wherein the convolutional LSTM neural network is configured to, at each of a plurality of time steps, receive a representation of an observation characterizing a state of the environment at the time step and to process (i) the representation and (ii) a state of the convolutional LSTM neural network as of the time step to (iii) generate a final LSTM hidden state output for the time step and (iv) update the state of the convolutional LSTM neural network for the time step,
        wherein the state of the convolutional LSTM neural network as of the time step includes a respective cell state and a respective hidden state for each convolutional LSTM layer in the stack,
        wherein the respective cell state and the respective hidden state for each convolutional LSTM layer in the stack are respective three-dimensional tensors, and
        wherein each convolutional LSTM layer has a plurality of gates that each apply a convolution operation on an input to the gate as part of updating the respective cell state and the respective hidden state for the convolutional LSTM layer at each time step; and
    an action selection neural network that is configured to, at each of the plurality of time steps, receive an action selection input comprising the final LSTM hidden state output for the time step and to process the action selection input to generate an action selection output that defines an action to be performed by the agent at the time step in accordance with an action selection policy.

2. The system of claim 1, wherein the final LSTM hidden state output for the time step is the hidden state of the last convolutional LSTM layer in the stack in the updated state for the time step.

3. The system of claim 2, wherein the convolutional LSTM neural network is configured to process for N ticks for each time step, wherein N is greater than one, and wherein the processing comprises, for each of the N ticks:
    processing (i) the representation and (ii) a state of the convolutional LSTM neural network as of the tick to update the state of the convolutional LSTM neural network for the tick.

4. The system of claim 3, wherein the final LSTM hidden state output for the time step is the hidden state of the last convolutional LSTM layer in the stack after the Nth tick for the time step, and wherein the updated state of the convolutional LSTM neural network for the time step is the updated state of the convolutional LSTM neural network after the Nth tick for the time step.

5. The system of claim 3, wherein the state of the convolutional LSTM neural network as of the first of the N ticks for the time step is the updated state of the convolutional LSTM neural network for a preceding time step.

6. The system of claim 3, wherein each convolutional LSTM neural network layer in the stack is configured to, at each of the N ticks:
    process a layer input for the tick to update the cell state and the hidden state of the convolutional LSTM neural network layer as of the tick.

7. The system of claim 6, wherein the layer input for the tick for each particular convolutional LSTM neural network layer other than the first layer in the stack comprises the updated hidden state for the tick of the layer immediately before the particular layer in the stack.

8. The system of claim 6, wherein the layer input for the tick for each layer in the stack comprises the representation for the time step.

9. The system of claim 6, wherein, for each tick other than the first of the N ticks, the layer input for the tick for the first layer in the stack comprises the updated hidden state of the last layer in the stack for the preceding tick.

10. The system of claim 9, wherein, for the first of the Nticks, the layer input for the tick for the first layer in the stack comprises the updated hidden state of the last layer in the stack for the preceding time step.

11. The system of claim 6, wherein the convolutional LSTM neural network is further configured to, for each tick and for each convolutional LSTM layer:
for each channel dimension of the updated hidden state of the layer for the time step:
apply one or more pooling operations spatially to generate one or more pooled outputs for the channel dimension,
project the pooled outputs using a linear layer corresponding to the convolutional LSTM layer to generate a projected output; and
tile the projected output over space to generate a summary tensor,
wherein the layer input for each layer in the stack for the tick comprises the summary tensor for the layer for the preceding tick or, if the tick is the first tick for the time step, the summary tensor for the layer for the Nth tick for the preceding time step.

12. The system of claim 11, wherein the one or more pooling operations comprise a max pooling operation, a mean pooling operation, or both.

13. The system of claim 1, wherein the convolutional LSTM neural network is configured to append a feature map to the input of the convolutional operators for the convolutional LSTM layers in the stack that designates a boundary of an input tensor to the convolutional operator.

14. The system of claim 1, wherein the action selection input further comprises the representation for the time step.

15. The system of claim 1, wherein the neural network system further comprises:
an encoder neural network configured to, at each of the plurality of time steps, process the observation characterizing the state of the environment at the time step to generate the representation of the observation for the time step.

16. The system of claim 15, wherein the observation comprises an image of the environment and wherein the encoder neural network comprises one or more convolutional layers.

17. The system of claim 1, wherein the action selection neural network comprises one or more fully-connected layers.

18. The system of claim 1, wherein the representation is an H×W×C tensor and wherein the state of the convolutional LSTM neural network and the final LSTM hidden state output preserve the spatial dimensions of the representation.

19. A method for controlling an agent interacting with an environment, the method comprising, at each of a plurality of time steps:
obtaining a representation of an observation characterizing a state of the environment at the time step;
processing the representation using a convolutional long short-term memory (LSTM) neural network comprising a plurality of convolutional LSTM neural network layers arranged in a stack one after the other,
wherein the convolutional LSTM neural network is configured to receive the representation of the observation characterizing the state of the environment at the time step and to process (i) the representation and (ii) a state of the convolutional LSTM neural network as of the time step to (iii) generate a final LSTM hidden state output for the time step and (iv) update the state of the convolutional LSTM neural network for the time step,
wherein the state of the convolutional LSTM neural network as of the time step includes a respective cell state and a respective hidden state for each convolutional LSTM layer in the stack,
wherein the respective cell state and the respective hidden state for each convolutional LSTM layer in the stack are respective three-dimensional tensors, and
wherein each convolutional LSTM layer has a plurality of gates that each apply a convolution operation on an input to the gate as part of updating the respective cell state and the respective hidden state for the convolutional LSTM layer at each time step;
processing an action selection input comprising the final LSTM hidden state output for the time step using an action selection neural network that is configured to receive the action selection input and to process the action selection input to generate an action selection output that defines an action to be performed by the agent at the time step in accordance with an action selection policy;
selecting, from the action selection output, the action to be performed by the agent at the time step in accordance with the action selection policy; and
causing the agent to perform the selected action.

20. One or more non-transitory computer-readable media storing instructions that when executed by one or more computers cause the one or more computers to perform operations for controlling an agent interacting with an environment, the operations comprising, at each of a plurality of time steps:
obtaining a representation of an observation characterizing a state of the environment at the time step;
processing the representation using a convolutional long short-term memory (LSTM) neural network comprising a plurality of convolutional LSTM neural network layers arranged in a stack one after the other,
wherein the convolutional LSTM neural network is configured to receive the representation of the observation characterizing the state of the environment at the time step and to process (i) the representation and (ii) a state of the convolutional LSTM neural network as of the time step to (iii) generate a final LSTM hidden state output for the time step and (iv) update the state of the convolutional LSTM neural network for the time step,
wherein the state of the convolutional LSTM neural network as of the time step includes a respective cell state and a respective hidden state for each convolutional LSTM layer in the stack,
wherein the respective cell state and the respective hidden state for each convolutional LSTM layer in the stack are respective three-dimensional tensors, and wherein each convolutional LSTM layer has a plurality of gates that each apply a convolution operation on an input to the gate as part of updating the respective cell state and the respective hidden state for the convolutional LSTM layer at each time step;

processing an action selection input comprising the final LSTM hidden state output for the time step using an action selection neural network that is configured to receive the action selection input and to process the action selection input to generate an action selection output that defines an action to be performed by the agent at the time step in accordance with an action selection policy;

selecting, from the action selection output, the action to be performed by the agent at the time step in accordance with the action selection policy; and causing the agent to perform the selected action.

* * * * *